May 25, 1948. J. H. LEWIS 2,442,242
BENDING OF GLASS BY PRESSING ON HEATED MOLDS
Filed Jan. 17, 1945 2 Sheets-Sheet 1

Inventor
Joseph H Lewis
By
Attorney

May 25, 1948. J. H. LEWIS 2,442,242
BENDING OF GLASS BY PRESSING ON HEATED MOLDS
Filed Jan. 17, 1945 2 Sheets-Sheet 2
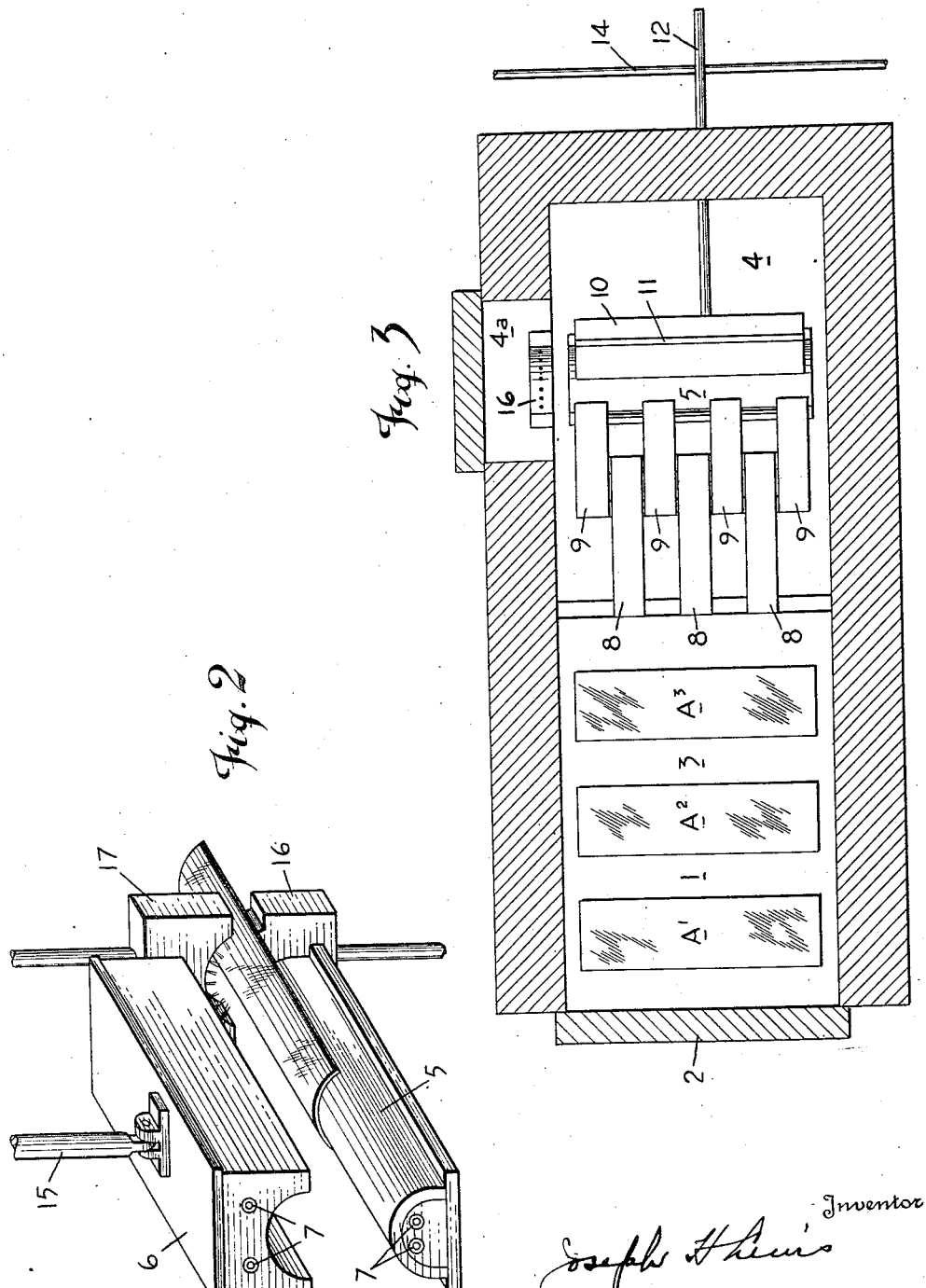

Patented May 25, 1948

2,442,242

UNITED STATES PATENT OFFICE 2,442,242

BENDING OF GLASS BY PRESSING ON HEATED MOLDS

Joseph H. Lewis, Kingsport, Tenn., assignor to Blue Ridge Glass Corporation, Kingsport, Tenn., a corporation of New York Application January 17, 1945, Serial No. 573,164

4 Claims. (Cl. 49—1)

This invention relates to means for economically and efficiently bending flat sheets of glass to other contours, such as segments of cylinders and comprises means for heating the flat glass, transferring it while plastic to shaping means, means for shaping the glass and means for chilling the shaped glass as it leaves the shaping means, all as will be hereinafter described and claimed.

Referring to the accompanying drawing in which—

Figure 2 is a detailed perspective view of the molded parts and blast boxes.

Figure 3 is a horizontal sectional view of the device shown in Figure 1.

Figure 1:
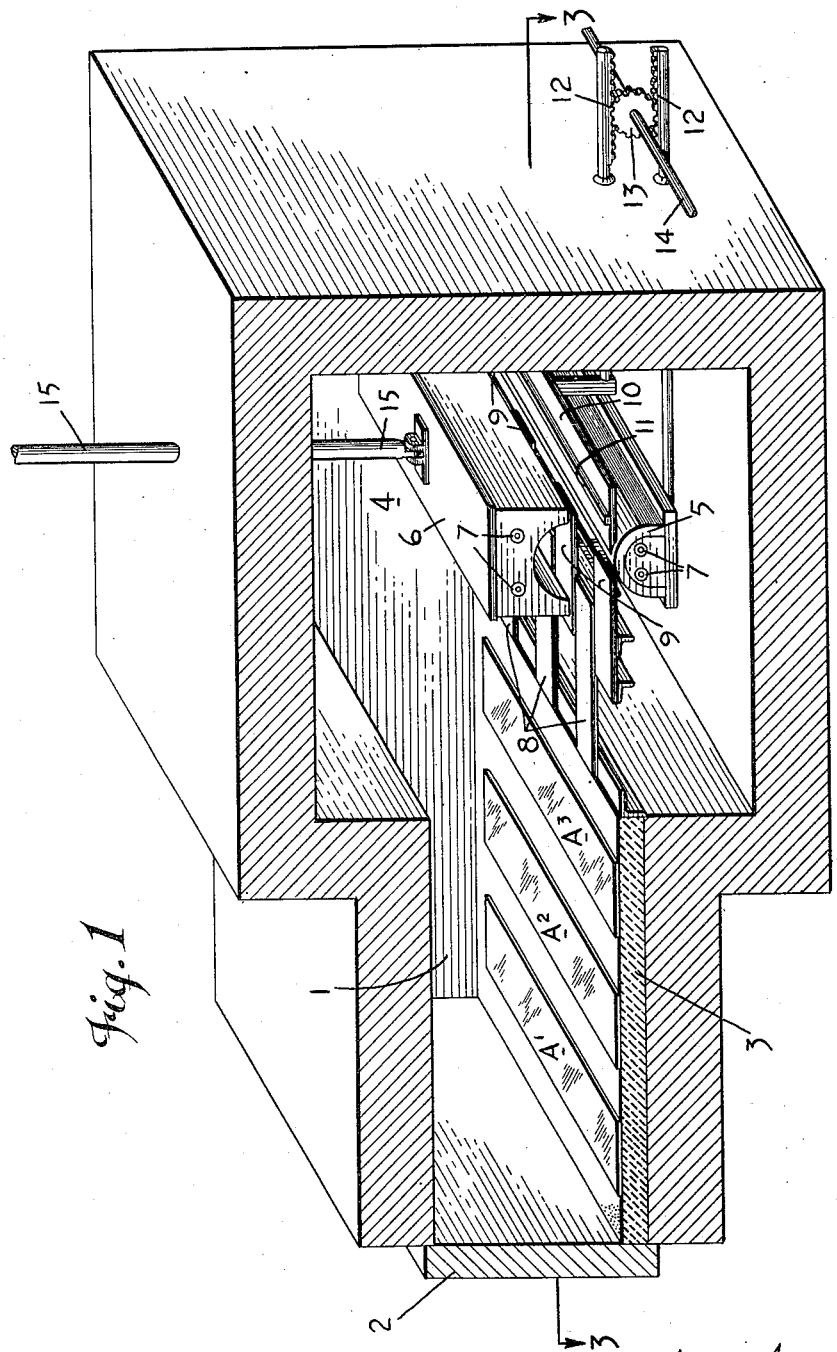
Figure 1 is a vertical section in perspective of a structure embodying my invention.

1 is a suitable heating furnace having a door 2 at one end through which sheets of flat glass A', A², A³, which it is desired to bend may be introduced and laid on a silica hearth 3. The temperature within the chamber is that suitable for rendering the sheets plastic as they are shoved therethrough by any suitable means.

The heating chamber 1 opens into a bending chamber 4 at its end opposite the door 2.

Located within the bending chamber is the bending mechanism comprising the fixed lower mold part 5 and the upper vertically movable mold part 6 located thereabove, having the desired contour on their opposite faces according to the bend to be produced in the sheet. The mold parts may be heated to the desired temperature by heating units 7 located therein.

Spaced fingers 8 project into the bending chamber from the end of the hearth and towards the lower mold part and located between them are the movable fingers 9. When these last fingers are extended, they together with the fixed fingers serve as an extension of the hearth 3 adjacent to the top of the lower mold part, thus serving as a table.

On the opposite side of the lower mold part is a movable table 10 having a suitable rib 11 thereon serving to arrest the movement of a sheet when shoved between the mold parts.

The fingers 9 and the table 10 are moved horizontally towards and from the lower mold part by rack rods 12 engaging the diametrically opposite sides of the cog wheel 13 mounted on the shaft 14.

The upper mold part is lifted and pressed down by a suitable actuated piston 15.

Lower and upper blast boxes 16 and 17 are located in alignment with the mold parts when closed and between the ends of the latter and a withdrawing door on one side of the bending chamber 4a.

In the use of the above described structure, the sheets A', A² and A³ are put into the heating chamber one by one and are fed therein and on to the fingers 8 and 9 (the fingers 9 being in the position shown) and over the lower mold part (the upper mold part being raised) until its leading edge of a sheet contacts with the stop rib 11, the rate of feed being such that the plate will be then sufficiently plastic to bend. The fingers 9 and the table 10 are then withdrawn from proximity to the lower mold part and the sheet sags down around the latter, this being assisted by the descent of the upper mold part. Shaping having been finished the upper mold part is lifted and the bent sheet is slid endwise from the lower mold part and out of the bending chamber passing in this movement between the blast boxes as shown in Figure 2 whereby it is set before it can deform.

Having thus described my invention, what I claim is:

1. The combination with a sheet glass heating chamber having a hearth, of a bending chamber connected therewith, separable upper and lower mold parts in the bending chamber, means for supporting a heated sheet in a flat condition while shifting it from the hearth to over the lower mold part, blast boxes located adjacent to the ends in the mold parts and means for withdrawing the supporting means for the sheet from its supporting position and means for actuating a mold part.

2. The combination with a sheet glass heating chamber having a hearth, of a bending chamber connected therewith, separable upper and lower mold parts in the bending chamber, a shiftable support for the glass between the lower mold part and the hearth, blast boxes located adjacent to the ends in the mold parts and means for withdrawing the support for the glass from its supporting position and means for actuating a mold part.

3. The combination with a sheet glass heating chamber having a hearth, of a bending chamber connected therewith, upper and lower mold parts in the bending chamber, an extension of the hearth of the heating chamber consisting of movable separable parts located on opposite sides of the lower mold parts, means for separating the parts of the hearth extension and means for depressing the upper mold part.

4. The combination with a sheet glass heating chamber having a hearth, of a bending chamber connected therewith, upper and lower mold parts in the bending chamber, an extension of the hearth of the heating chamber consisting of movable separable parts located on opposite sides of the lower mold part, blast boxes located adjacent to the ends of the mold parts and means for separating the parts of the hearth extension and means for actuating the upper mold part.

JOSEPH H. LEWIS.

REFERENCES CITED

The following references are of record in the file of this patent:

UNITED STATES PATENTS

| Number | Name | Date |
|---|---|---|
| 4,786 | Paine | Oct. 3, 1846 |
| 2,111,370 | Owen | Mar. 15, 1938 |
| 2,131,873 | Goodwillie | Oct. 4, 1938 |
| 2,223,124 | Owen | Nov. 26, 1940 |
| 2,247,118 | Drake | June 24, 1941 |
| 2,251,159 | Owen | July 29, 1941 |
| 2,369,368 | Paddock et al. | Feb. 13, 1945 |
| 2,370,575 | Owen | Feb. 27, 1945 |